United States Patent
Nishiara

(12) 
(10) Patent No.: US 6,289,092 B1
(45) Date of Patent: Sep. 11, 2001

(54) METHOD AND APPARATUS FOR SELECTIVELY SUSPENDING OR ACTIVATING A CALL WAITING SERVICE

(75) Inventor: Tsuguhito Nishiara, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/016,451

(22) Filed: Jan. 30, 1998

(30) Foreign Application Priority Data

May 1, 1997 (JP) .................................................. 9-113754

(51) Int. Cl.⁷ ...................................................... H04M 3/42
(52) U.S. Cl. ........................ 379/215; 379/201; 379/93.35
(58) Field of Search ................................. 379/215, 93.35, 379/201

(56) References Cited

U.S. PATENT DOCUMENTS

| | | | |
|---|---|---|---|
| 5,491,744 | * 2/1996 | Kikinis | 379/215 |
| 5,513,251 | * 4/1996 | Rochkind et al. | 379/215 |
| 5,519,767 | * 5/1996 | O'Horo et al. | 379/215 |
| 5,546,451 | * 8/1996 | Shen | 379/215 |
| 5,604,796 | * 2/1997 | Yamazaki | 379/215 |
| 5,636,269 | * 6/1997 | Eisdorfer | 379/215 |
| 5,706,336 | * 1/1998 | Kikinis | 379/215 |
| 5,764,748 | * 6/1998 | Rosenthal et al. | 379/215 |
| 5,784,448 | * 7/1998 | Yaker | 379/215 |
| 5,809,128 | * 9/1998 | McMullin | 379/215 |
| 5,848,142 | * 12/1998 | Yaker | 379/215 |
| 5,857,017 | * 1/1999 | Ohi et al. | 379/215 |

FOREIGN PATENT DOCUMENTS 63-142755   6/1988   (JP) .
64-71256    3/1989   (JP) .

* cited by examiner

Primary Examiner—Ahmad Matar
Assistant Examiner—William J. Deane, Jr.
(74) Attorney, Agent, or Firm—Helfgott & Karas, PC

(57) ABSTRACT

An exchange identifies a destination telephone number dialed by a subscriber, accesses a database access unit to determine whether the subscriber performs data communication or speech communication based on the identified destination telephone number, suspends a call waiting service when the subscriber performs data communication service and activates the call waiting service when the subscriber performs speech communication.

7 Claims, 12 Drawing Sheets

PRIOR ART

METHOD AND APPARATUS FOR SELECTIVELY SUSPENDING OR ACTIVATING A CALL WAITING SERVICE

BACKGROUND OF THE INVENTION

1. Field of the Invention

The present invention generally relates to telephone switching methods and telephone switching apparatuses and, more particularly, to a telephone switching method and a telephone switching apparatus which utilizes a general switched telephone network to perform data communication and voice communication.

Recently, an increasing number of subscribers to a general switched telephone network connect a personal computer to a telephone line so as to perform data communication on, for example, the Internet.

Subscribers to the general switched telephone network are given an option of call waiting service in which a sound is produced while a user is engaged in a voice communication so as to indicate that there is an additional incoming call. Upon hearing the sound, the user can selectively communicate with a current partner or a new caller using a hook operation. Recently, the call waiting service has become extensively used.

In the call waiting service, the sound is superimposed on the current telephone line so as to notify the user of a new incoming call. If data communication is performed while the sound is being produced, the sound is superimposed on the data, resulting in damage to the data or an error in communication.

For this reason, the user is required to suspend the call waiting service while he or she is engaged in data communication.

2. Description of the Related Art

FIG. 1 shows an operation performed in the telephone switching method according to the related art.

When subscriber A performs an off-hook operation so as to dial a telephone number of subscriber B, an exchange 110 connects subscriber A to an exchange 120 to which subscriber B belongs. The exchange 120 calls the subscriber B using the telephone number dialed by subscriber A. When subscriber B responds to the call by performing an off-hook operation, subscriber A and subscriber B are connected to each other so that they can start voice communication.

When a call is originated by subscriber C to subscriber A via the exchange 110, an interrupt is asserted to the voice communication between subscriber A and subscriber B in response to the call from subscriber C, if subscriber A subscribers to the call waiting service. A sound is provided to subscriber A indicating that there is a call from another party waiting.

By operating a hook, subscriber A can selectively talk with subscriber B or subscriber C.

A description will now be given of a connection to the Internet.

FIG. 2 shows a connection to the Internet according to the related art.

When subscriber A requests connection to the Internet using a personal computer 200, the personal computer 200 activates a dialer so as to set a telephone line 210 to an off-hook status and dial an Internet service provider 220.

The exchange 110 connects subscriber A to the exchange 120 to which the Internet service provider 220 belongs so that the exchange 120 connects to the Internet service provider 220.

When a call is originated by subscriber C to subscriber A via the exchange 110, an interrupt is asserted to the voice communication between subscriber A and subscriber B in response to the call from subscriber C, if subscriber A subscribes to the call waiting service. A sound is provided to subscriber A indicating that there is a call from another party waiting. Since subscriber A is engaged in data communication using the personal computer 200, the data being exchanged during the communication may be damaged or an error may occur in the communication as a result of the sound being superimposed on the telephone line.

Some approaches to preventing damage to data or an error in communication from occurring as a result of an interrupt during data communication are proposed in Japanese Laid-Open Patent Applications No. 63-142755 and No. 64-71256.

A description will now be given, with reference to FIG. 3, of an approach disclosed in Japanese Laid-Open Patent Application No. 63-142755.

FIG. 3 shows an operation according to Japanese Laid-Open Patent Application No. 63-142755 for preventing damage to data or an error in communication from occurring due to an interrupt to data communication.

Referring to FIG. 3, Japanese Laid-Open Patent Application discloses registering in an exchange 300 a special number (for example, #123) for identifying data communication or facsimile communication. When data communication or facsimile communication is to be performed, subscriber A dials #123 before dialing the telephone number of subscriber B. Upon detecting the special number #123 at the beginning of the number dialed by subscriber A, the exchange 300 disables an interrupt from subscriber C while subscriber A is communicating with subscriber B.

A description will now be given, with reference to FIG. 4, of an approach disclosed in Japanese Laid-Open Patent Application No. 64-71256.

FIG. 4 shows an operation according to Japanese Laid-Open Patent Application No. 64-71256 for preventing damage to data or an error in communication from occurring due to an interrupt to data communication.

Referring to FIG. 4, Japanese Laid-Open Patent Application No. 64-71256 discloses providing in an exchange 400 a registration table 401 for registering telephone numbers of subscribers to whom an interrupt is permitted. By dialing a predetermined special number, a subscriber can make a registration in the registration table 401 (step S3-1).

Assuming that subscriber A is communicating with subscriber B (step S3-2) and there is a request for interrupt from subscriber C to subscriber A (step S3-3), the exchange 400 searches the registration table 401 storing telephone numbers registered by subscriber A in step S3-1 (step S3-4).

If, as a result of the search in step S3-4, the telephone number of subscriber C is found in the registration table 401, the exchange 400 enables the interrupt from subscriber C (step S3-5).

In this way, interrupts from only designated users are enabled.

Japanese Laid-Open Patent Application No. 63-142755 has a drawback in that operability suffers because a subscriber is required to dial a special number before making a call.

Japanese Laid-Open Patent Application No. 64-71256 requires maintaining registration tables for each of the subscribers, resulting in a large number of registration tables. Therefore, the approach disclosed in Japanese Laid-Open Patent Application is difficult to implement in the general switched telephone network. Since an interrupt from non-designated subscribers is enabled during data communication, such approach does not prevent damage to data and an error in communication. Another disadvantage is that the call waiting service is not available for ordinary voice communication for telephone numbers not registered in the registration. The call waiting service such as this lacks availability. Further, subscribers are required to perform a complicated operation in order to provide a registration table.

SUMMARY OF THE INVENTION

Accordingly, an object of the present invention is to provide a telephone switching method and a telephone switching apparatus in which the aforementioned problems are eliminated.

Another and more specific object of the present invention is to provide a telephone switching method and a telephone switching apparatus in which damage to data in data communication is prevented.

The aforementioned objects can be achieved by a telephone switching method using a telephone switched network and provided with a call waiting service for producing an interrupt responsive to a call incoming to a first subscriber when the first subscriber is communicating with a second subscriber, comprising the steps of: identifying a destination number dialed by the first subscriber to originate a call, and determining whether the first subscriber is performing one of data communication and speech communication depending on the destination number identified; and suspending the call waiting service when it is determined that the first subscriber is performing data communication, and activating the call waiting service when it is determined that the first subscriber is performing voice communication.

According to the telephone switching method of the present invention, the call waiting service is suspended when a subscriber is performing data communication. Therefore, destruction of data or an error in communication does not occur even when an interrupt occurs during data communication. In ordinary speech communication, the call waiting service is activated so that the subscriber is provided with a benefit of the call waiting service. The subscriber is not required to perform any extra operations other than dialing a destination number as usual, in order to suspend the call waiting service. Operability provided by the present invention is decisively advantageous.

The aforementioned objects can also be achieved by

According to the telephone switching apparatus of the present invention, the call waiting service is suspended when a subscriber is performing data communication. Therefore, destruction of data or an error in communication does not occur even when an interrupt occurs during data communication. In ordinary speech communication, the call waiting service is activated so that the subscriber is provided with a benefit of the call waiting service. The subscriber is not required to perform any extra operations other than dialing a destination number as usual, in order to suspend the call waiting service. Operability provided by the present invention is decisively advantageous.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

Figure 1:
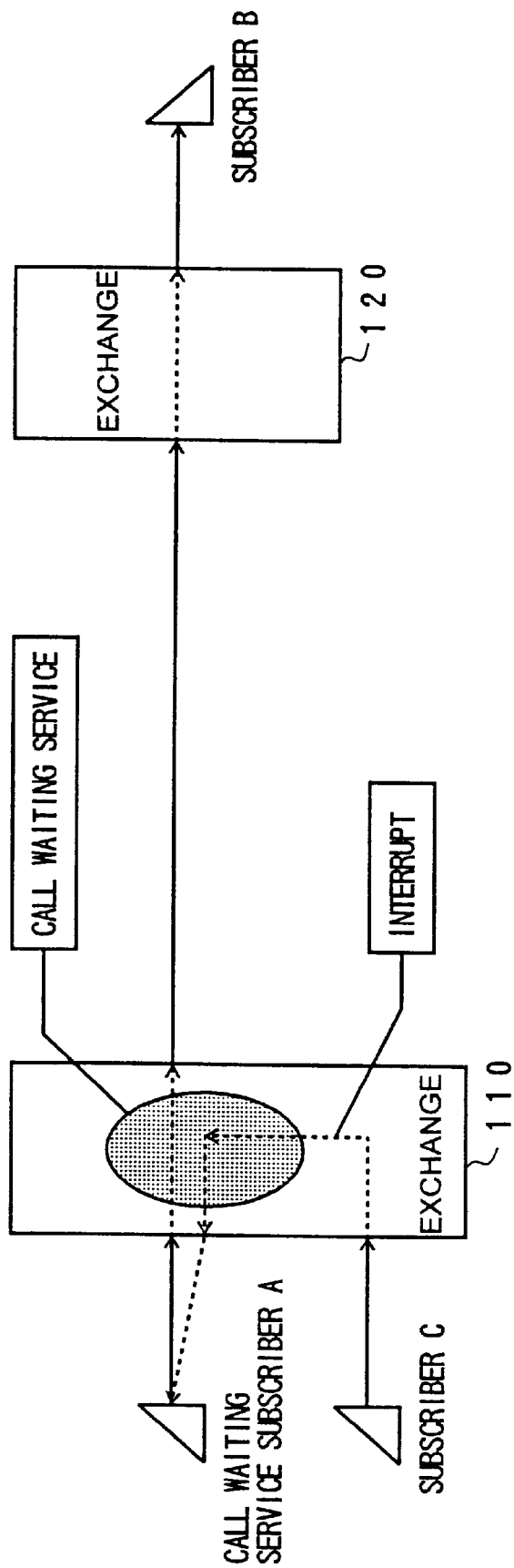
FIG. 1 shows an operation performed in a telephone switching method according to the related art.
Figure 2:
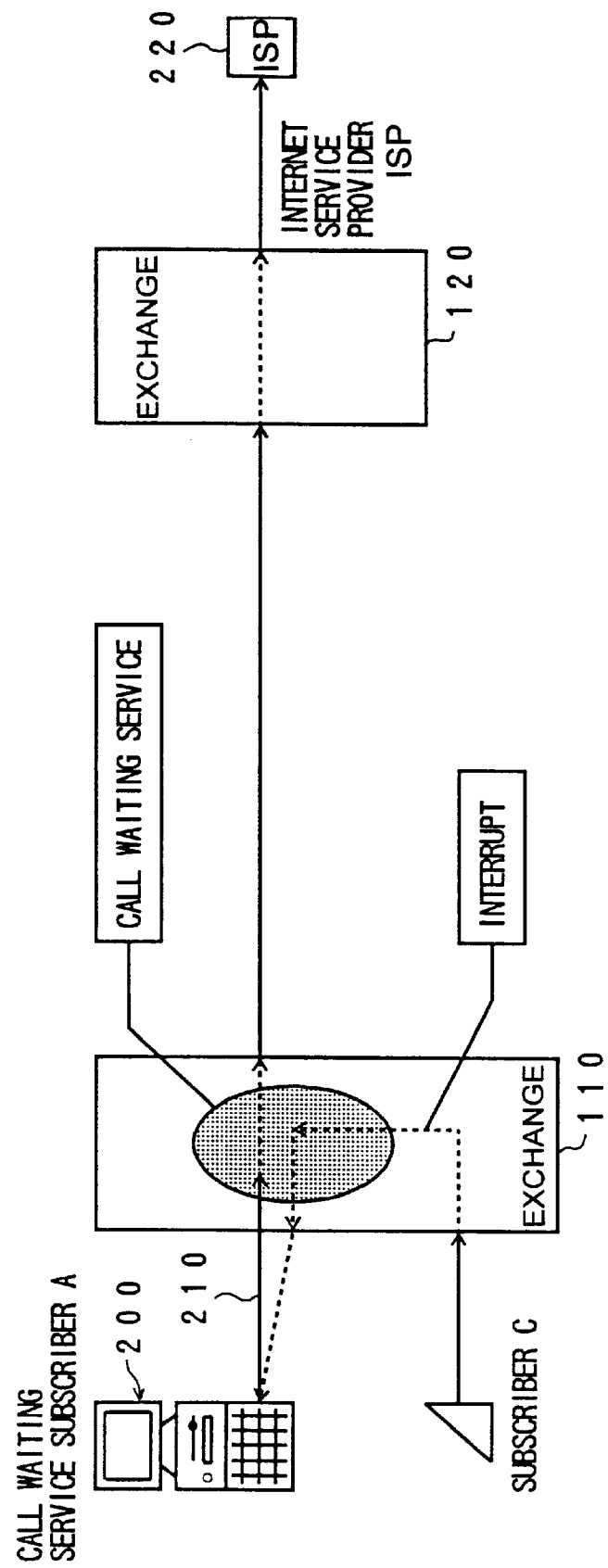
FIG. 2 shows connection to the Internet according to the related art.
Figure 3:
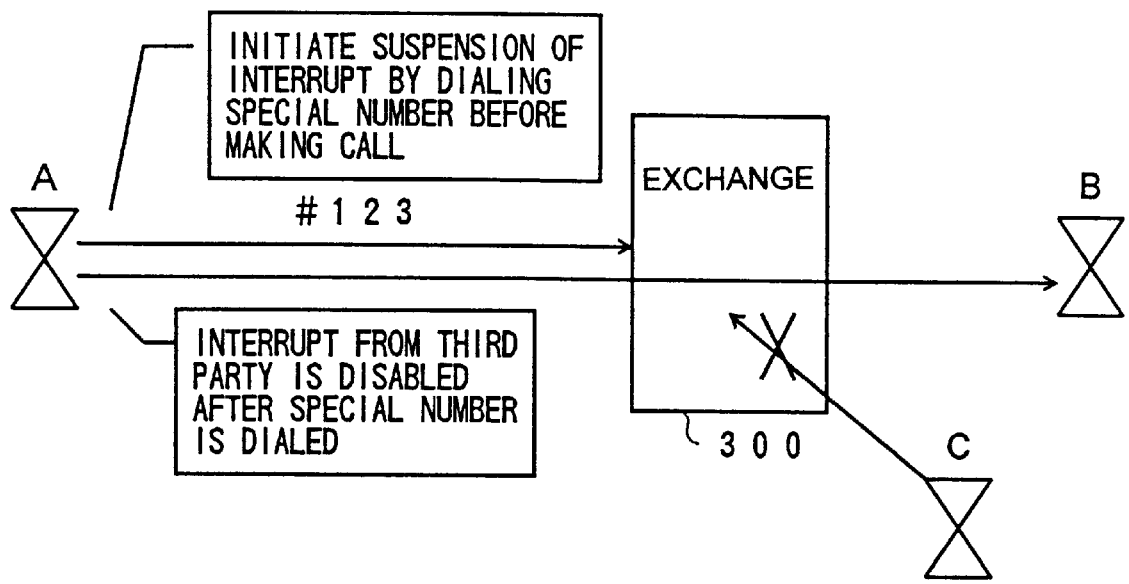
FIG. 3 shows an operation according to the related art for preventing damage to data or an error in communication from occurring due to an interrupt to data communication.
Figure 4:
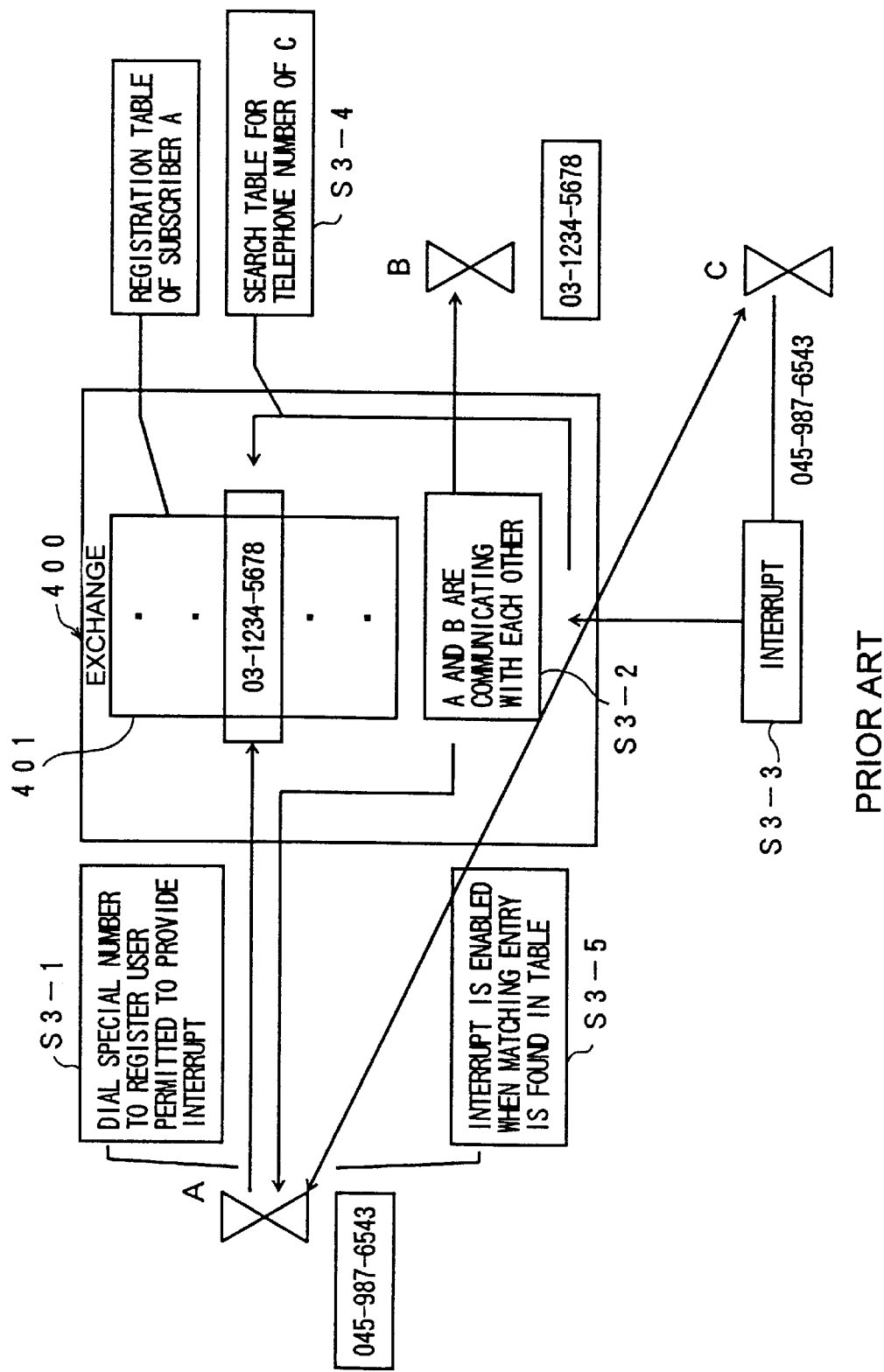
FIG. 4 shows another operation according to the related art for preventing damage to data or an error in communication from occurring due to an interrupt to data communication.
Figure 5:
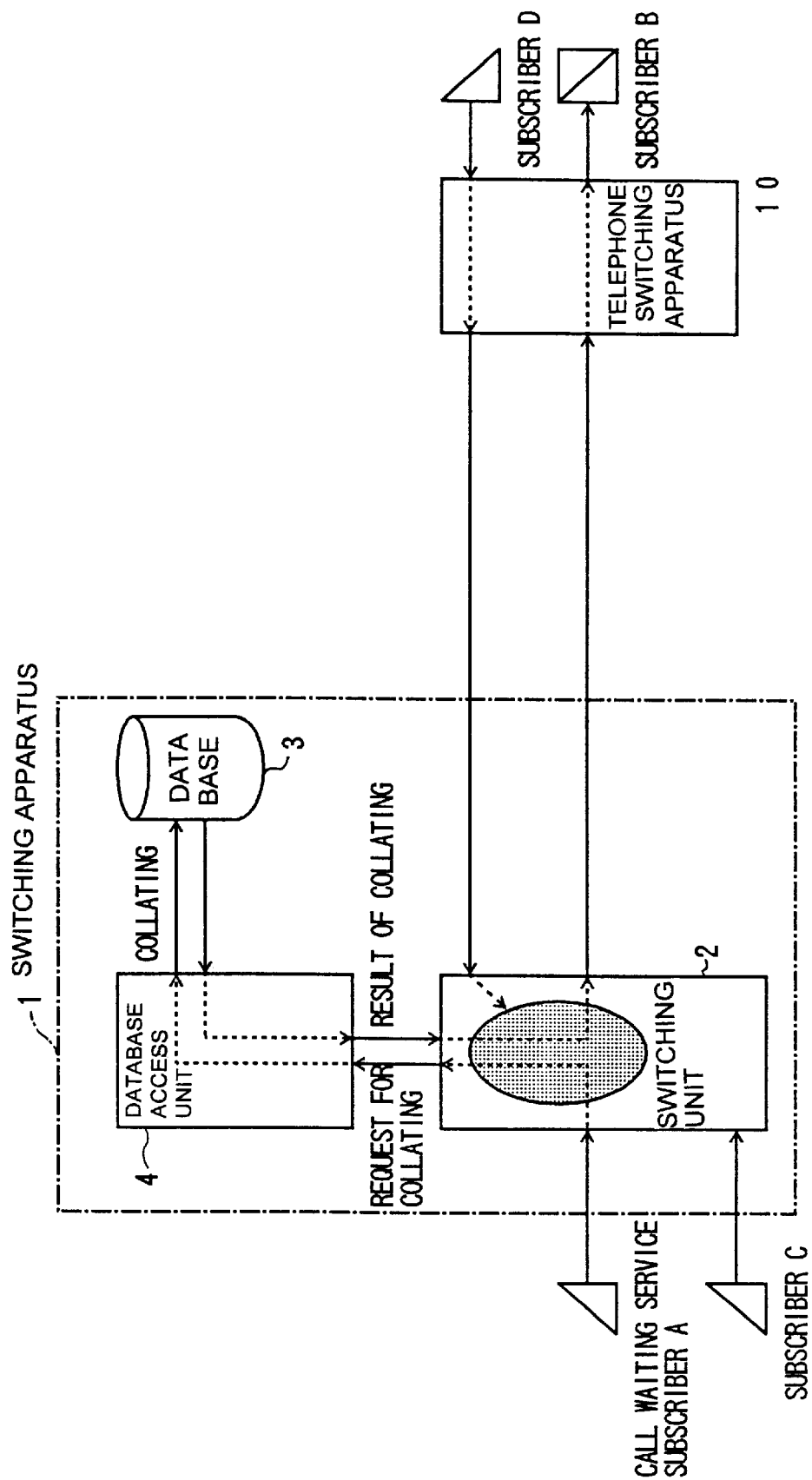
FIG. 5 is a block diagram showing telephone switching according a first embodiment of the present invention.

FIG. 5 is a block diagram showing telephone switching according a first embodiment of the present invention.

Referring to FIG. 5, a telephone switching apparatus 1 according to the first embodiment comprises a switching unit 2, a database 3, and a database access unit 4. The switching unit 2 performs an ordinary telephone switching operation and also provides the call waiting service as described already. As described later, the switching unit 2 suspends the call waiting service depending on a number dialed by a subscriber during data communication so as to prevent damage to data or an error in communication due to an interrupt during data communication.

The switching unit 2 is connected to the database 3 via the database access unit 4. As described later, the database access unit 4 examines the database 3 based on a search request from the switching unit 2 so as to enable a determination as to whether data communication is performed or ordinary communication is performed.

The database 3 is a nation-wide or world-wide database storing the numbers dialed for data communication. The database 3 is built by a telecomputing company or an Internet service provider requesting nearby exchanges and database centers to register the telephone numbers so that the nearby exchanges and the database centers register the telephone numbers in the database 3. The database 3 is made accessible to the telephone switching apparatus 1 and a telephone switching apparatus 10.

Figure 6:
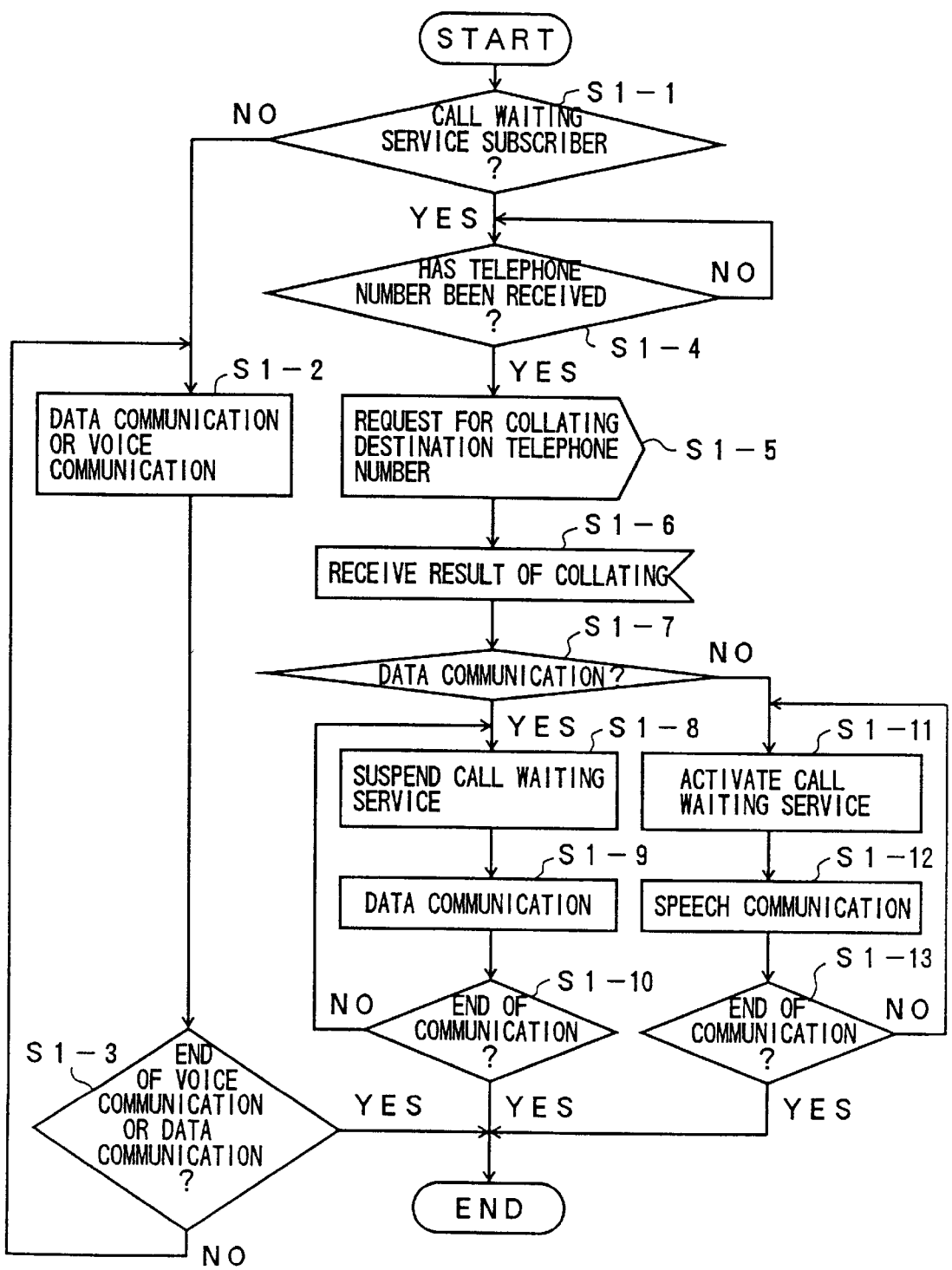
FIG. 6 is a flowchart showing an operation of a switching unit according to the first embodiment.

FIG. 6 is a flowchart showing an operation of the switching unit according to the first embodiment.

When a call request is originated by subscriber A, the switching unit 2 makes a determination as to whether subscriber A who originated the call is a call waiting service subscriber by examining the telephone number of the originating subscriber A (step S1-1).

When it is determined in step S1-1 that the originating subscriber A is not a call waiting service subscriber, subsequent processes are not necessary since no sound could be superimposed on data. Accordingly, normal data communication or voice communication proceeds beginning with an off-hook operation and ending in termination of the data communication or the voice communication (steps S1-2, S1-3).

The switching unit 2 makes a determination as to whether a call destination telephone number for subscriber B has been input by referring to the number of digits of the destination telephone number input by the originating subscriber A (step S1-4). When the destination telephone number has been input, the switching unit 2 requests the database access unit 4 to collate the destination telephone number (step S1-5).

The switching unit 2 then waits for a result of collating to be delivered from the database access unit 4 (step Sl-6).

Next, the switching unit 2 makes a determination as to whether to suspend or continue the call waiting service depending on the result of collating delivered from the database access unit 4 (step S1-7). When the result delivered in step S1-6 indicates that the destination telephone number is registered in the database 3, a determination that data communication is to proceed is given in step S1-7, whereupon the call waiting service is suspended and data communication is performed (steps S1-8, S1-9). Suspension of the call waiting service is maintained until an on-hook operation is performed to terminate the communication (step S1-10).

With this, the call waiting service is suspended so that even when there is a call incoming while the communication is proceeding, no sound is superimposed on the telephone line. Therefore, damage to data or an error in communication is prevented.

When the result delivered in step S1-6 indicates that the destination telephone number is not registered in the database 3, a determination that normal communication is to proceed is given in step S1-7, whereupon the call waiting service is activated and normal communication is performed (steps S1-11, S1-12). The call waiting service remains activated until an on-hook operation is performed to terminate the communication (step S1-13).

When there is a call incoming while the communication is proceeding, a sound for notifying subscriber A of the call incoming is provided to subscriber A so that subscriber A can selectively communicate with a plurality of destinations using a hook operation.

A description will now be given of a process performed by the database access unit 4 to collate the telephone number.

Figure 7:
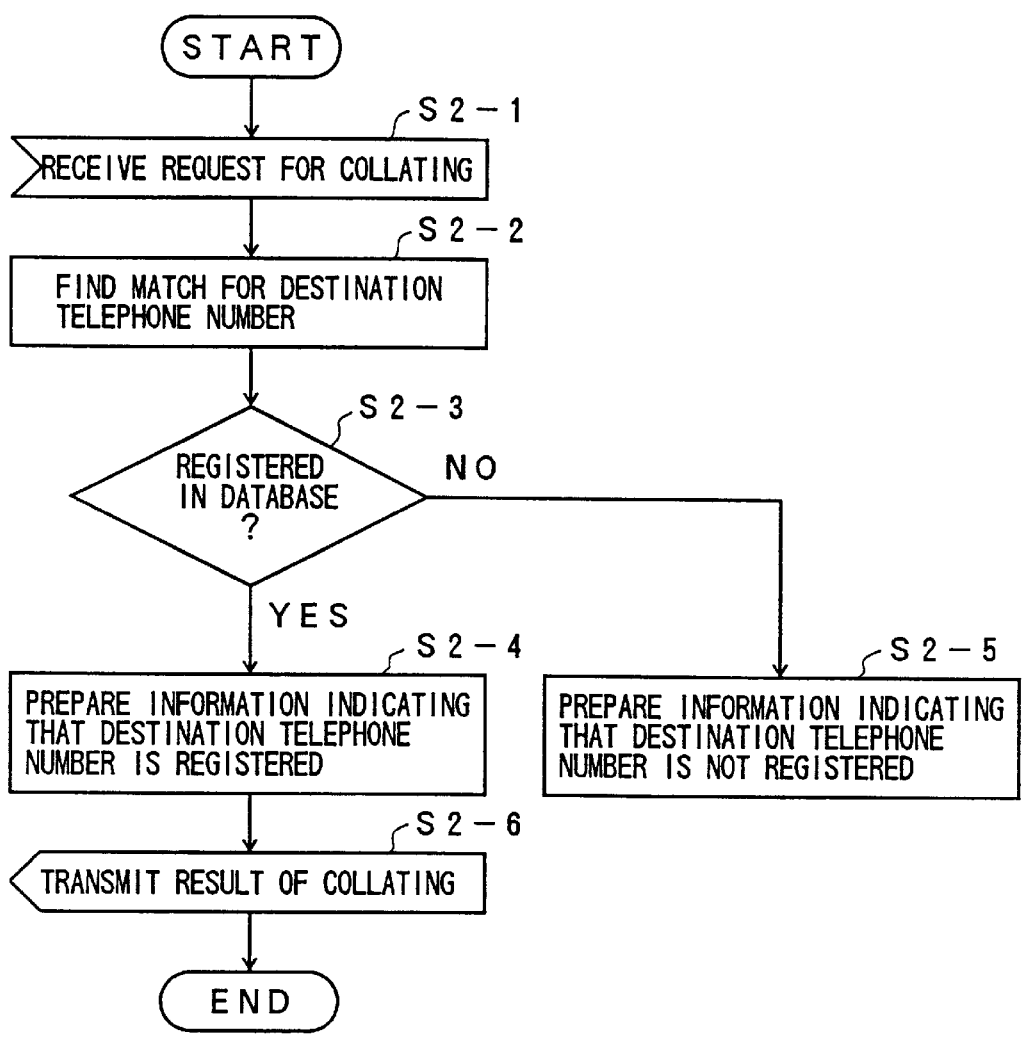
FIG. 7 is a flowchart showing an operation performed by a database access unit according to the first embodiment.

FIG. 7 is a flowchart showing an operation performed by the database access unit 4 according to the first embodiment.

Upon being supplied by the switching unit 2 with a request for collating, the database access unit 4 examines the database so as to find a match for the telephone number supplied together with the request for collating (steps S2-1, S2-2).

Collating of the destination telephone number in step S2-2 is performed by sequentially searching the database for a match with the destination telephone number. A determination is made as to whether there is a match with the destination telephone number supplied together with the request for collating, depending on the result of collating in step S2-2 (step S2-3).

When it is determined in step S2-3 that the database 3 registers a telephone number that matches the destination telephone number supplied from the switching unit 2 together with the request for collating, information is prepared (step S2-4) indicating that the destination telephone number supplied together with the request for collating is registered in the database 3. When it is determined in step S2-3 that the database 3 does not register a telephone number that matches the destination telephone number supplied from the switching unit 2 together with the request for collating, information is prepared (step S2-5) indicating that the destination telephone number is not registered in the database 3.

The database access unit 4 transmits the information prepared in step S2-4 or step S2-5 to the switching unit 2 as the result of collating (step 2-6).

A description will now be given of an operation of the switching unit 2 and the database access unit 4 in data communication.

Figure 8:
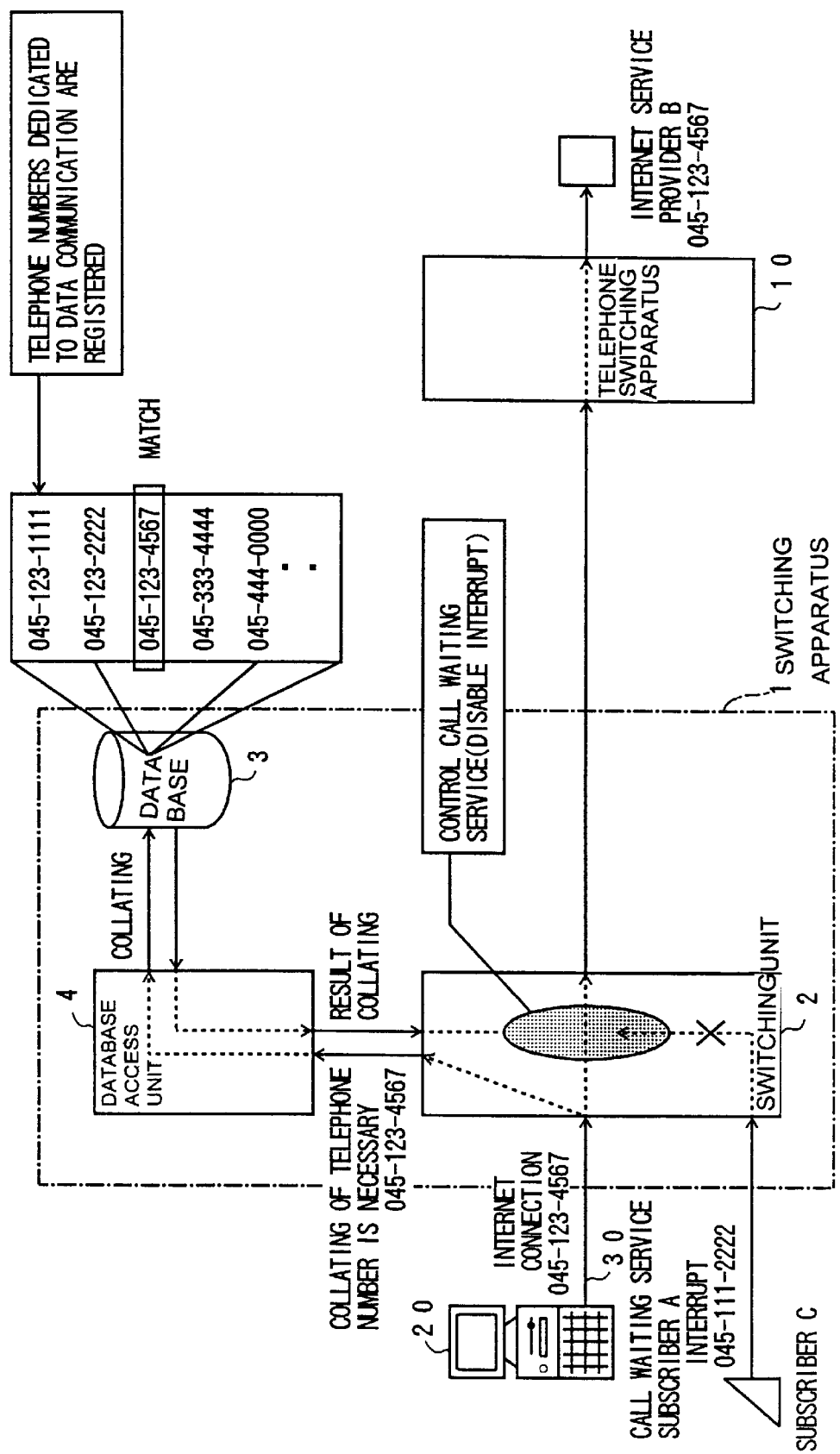
FIG. 8 illustrates an operation performed in data communication according to the first embodiment.

FIG. 8 illustrates an operation performed in data communication according to the first embodiment.

Referring to FIG. 8, when the call waiting service subscriber A connects a personal computer 20 to a general switched telephone network 30 so as to request data communication service (for example, start an Internet connection), the personal computer starts a dialer so as to set the general switched telephone network 30 to an off-hook status. The telephone number for Internet service provider B registered in the personal computer 20 is output to the telephone switching apparatus 10.

Upon detecting the off-hook status of subscriber A, the switching unit 2 of the telephone switching apparatus 10 makes a determination as to whether subscriber A subscribes to the call waiting service. If it is found that subscriber A is a call waiting service subscriber, the switching unit 2 requests the database access unit 4 to collate the number dialed by subscriber A. If subscriber A is not a call waiting service subscriber, the switching unit 2 performs an ordinary switching operation.

Since subscriber A is a call waiting service subscriber, the switching unit 2 supplies the telephone number supplied from the personal computer 20 to the database access unit 4. The database access unit 4 refers to the database 3 in response to the request for collating from the switching unit 2 so as to find a match with the telephone number supplied by the personal computer 20.

As described before, the database 30 may be a world-wide database storing telephone numbers dedicated to data communication. Thus, when subscriber A requests a connection to the Internet using the personal computer 20 by causing the personal computer 20 to dial the number for Internet service provider B, the switching unit 2 is supplied with information indicating that the telephone number for Internet service provider B is registered in the database 30.

Upon being supplied by the database access unit 4 with the information indicating that the telephone number dialed by subscriber A is registered in the database 30, the switching unit 2 controls the call waiting service for subscriber A to be suspended. After suspending the call waiting service for subscriber A, the switching unit 2 performs an ordinary switching operation so as to connect subscriber A to Internet service provider B via the telephone switching apparatus 10 connected to Internet service provider B.

It is assumed that subscriber C originates a call to subscriber A while the personal computer 20 of subscriber A is being connected to Internet service provider B for data communication. Since the call waiting service for subscriber A is suspended by the switching unit 2 while subscriber A is being connected to Internet service provider B, the call from subscriber C to subscriber A is not processed by the call waiting service. In other words, the interrupt is disabled. A busy tone is supplied to subscriber C indicating that subscriber A is busy.

Accordingly, no sound is superimposed on the data communication between the personal computer 20 and Internet service provider B so that no error occurs in the data communication.

A description will now be given of an operation of the switching unit and the database access unit in ordinary communication.

Figure 9:
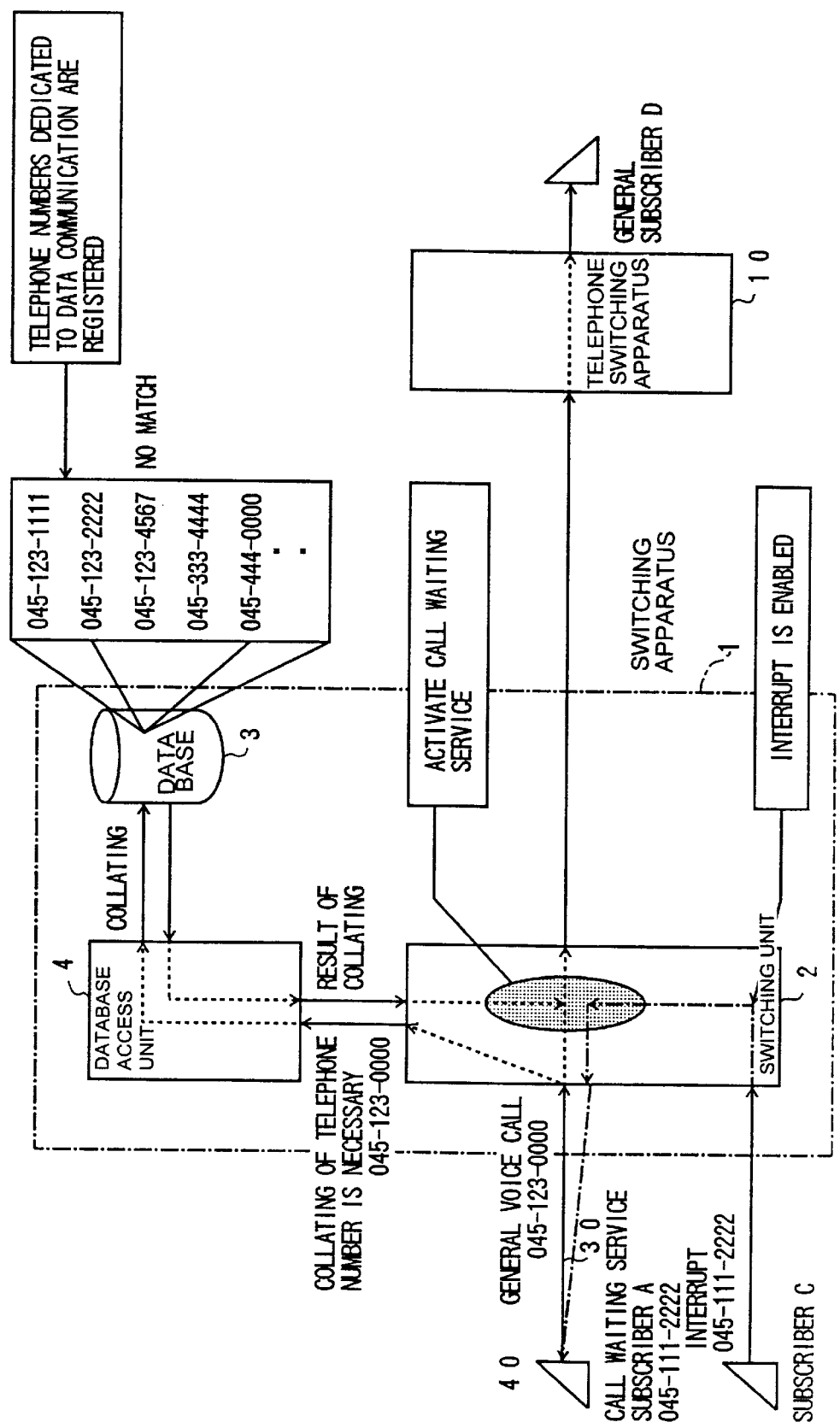
FIG. 9 illustrates an operation performed in ordinary communication according to the first embodiment.

FIG. 9 illustrates an operation performed in ordinary communication according to the first embodiment.

Referring to FIG. 9, a call waiting service subscriber A sets a telephone set 40 to an off-hook status in order to perform an ordinary speech communication with general subscriber D. When subscriber A sets the telephone set 40 to an off-hook status, the switching unit 2 detects the off-hook status of the telephone set 40 of the subscriber A. The switching unit 2 then determines whether subscriber A is a call waiting service subscriber. If it is determined that subscriber A is a call waiting service subscriber, the switching unit 2 requests the database access unit 4 to collate the number dialed by subscriber A. If an off-hooked subscriber is not a call waiting service subscriber, the switching unit 2 performs an ordinary switching operation.

When the destination telephone number has been dialed, the switching unit 2 supplies the telephone number supplied by subscriber A to the database access unit 4. In response to the request for collating from the switching unit 2, the database access unit 4 refers to the database 3 to find a match with the telephone number supplied by the telephone number 40 of subscriber A.

Since the telephone number dialed by subscriber A is the telephone number for general subscriber D and is not registered in the database 3, the result of searching the database 3 should indicate that no matching telephone number is found in the database 3. Thus, the database access unit 4 prepares information indicating that there is no matching telephone number in the database 3 and supplies such information to the switching unit 2.

Upon being supplied by the database access unit 4 with the information indicating that there is no matching telephone number in the database 3, the switching unit 2 activates the call waiting service. The switching unit 2 then performs an ordinary switching operation with respect to the telephone number supplied by subscriber A so as to call subscriber B.

When there is a call from subscriber C to subscriber A while subscriber A and subscriber B are communicating with each other, the switching unit 2 supplies a sound to subscriber A indicating that there is a call incoming, since subscriber A is a call waiting subscriber and the call waiting service is activated. By performing a hook operation, subscriber A can selectively communicate with subscriber B and subscriber C.

Thus, subscriber A can benefit from call waiting service in ordinary communication. In data communication, the call waiting service is automatically suspended so that data destruction is prevented. Since this process is automatically performed by the telephone switching apparatus 1, subscriber A may remain unaware of the process. It is not necessary for subscriber A to perform a complicated operation.

While it is assumed in the first embodiment that the database 3 and the database access unit 4 are provided in the telephone switching apparatus 1, they need not be provided in the telephone switching apparatus 1. The database 3 may be anywhere as long as it is accessible by a remote telephone switching apparatus.

Figure 10:
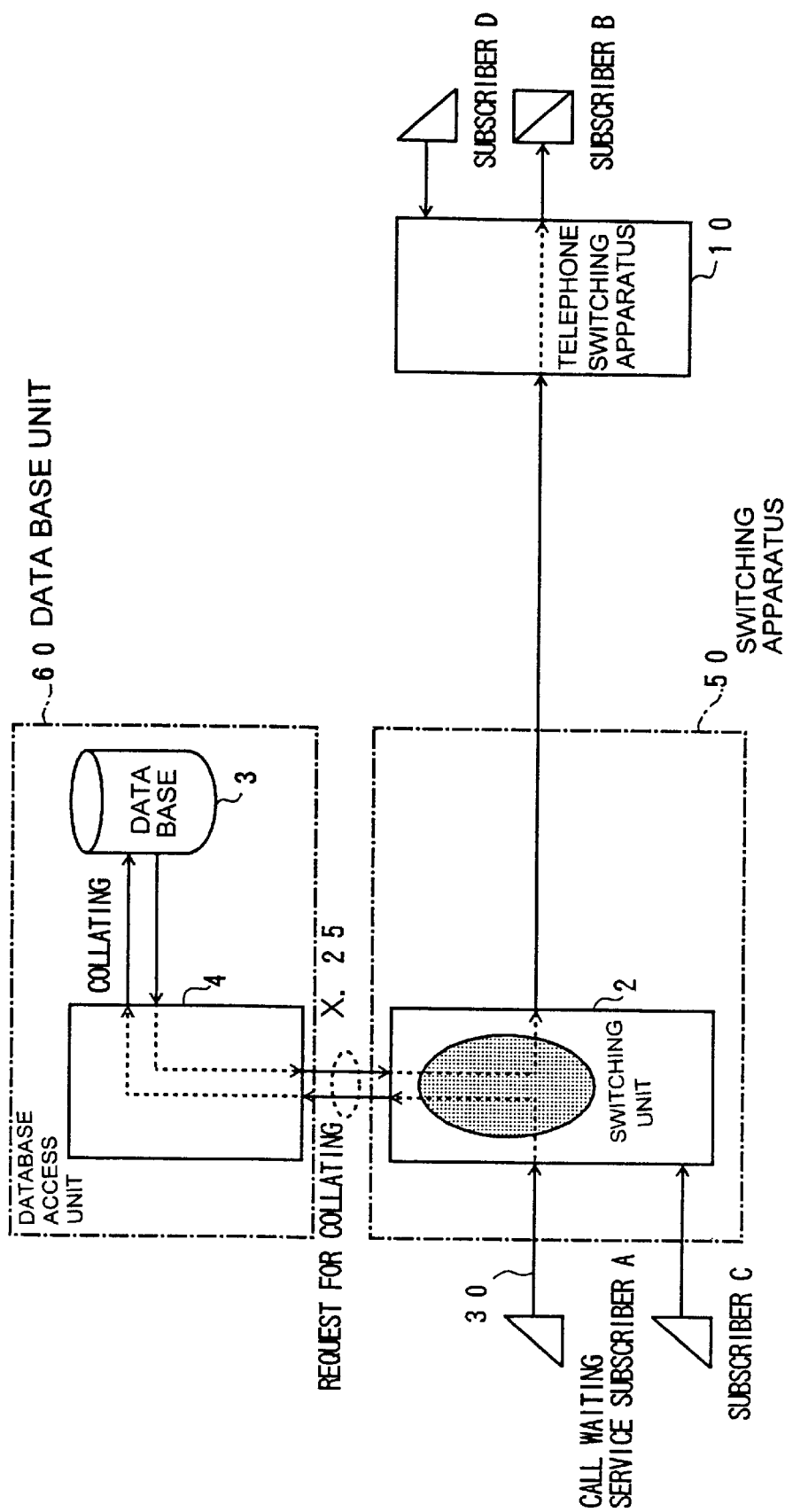
FIG. 10 is a block diagram showing telephone switching according to a second embodiment of the present invention.

FIG. 10 is a block diagram showing telephone switching according to a second embodiment of the present invention. In FIG. 10, those components that are the same as the corresponding components in FIG. 5 are designated by the same reference numerals and the description thereof is omitted.

In the second embodiment, a telephone switching apparatus 50 having the switching unit 2 is provided separately from a database unit 60 comprising the database 3 and the database access unit 4. The database unit 60 and the telephone switching apparatus 50 may be connected to each other via an X.25 interface which is stipulated by ITU-TSS as an interface for terminals operating in a packet mode in the public data network. The database unit 60 is shared by a plurality of the telephone switching apparatuses 50.

The databases 60 are connected to each other using the X.25 interface so that data exchange by mirroring is enabled.

Figure 11:
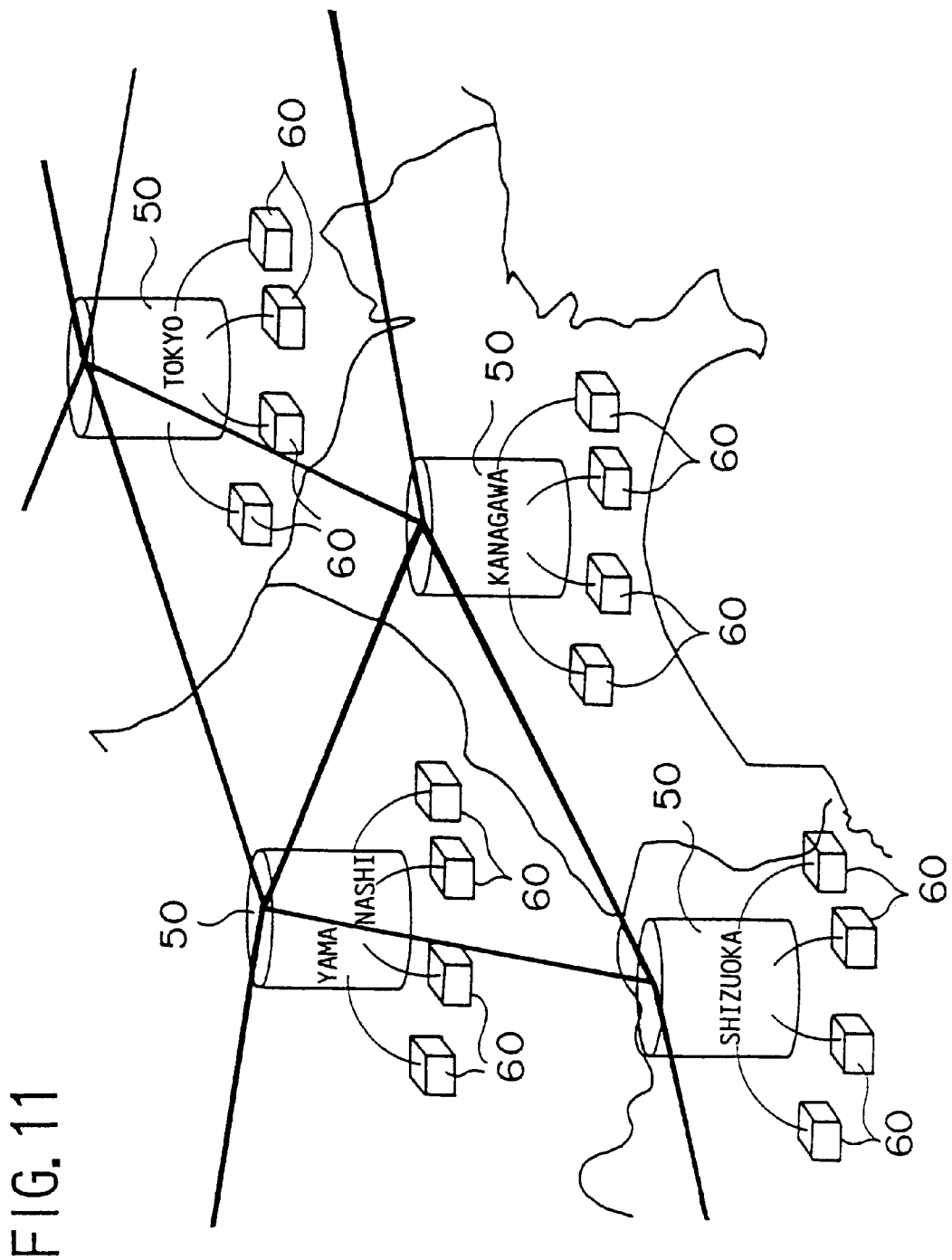
FIG. 11 shows how the database unit is provided according to the second embodiment.

FIG. 11 shows how the database unit is provided according to the second embodiment.

The database unit 60 is provided for each prefectural area. A plurality of the database units 60 belonging to the respective prefectural areas are connected to each other by the X.25 interface. The switching unit 2 of the telephone switching apparatus 50 performs an operation similar to the operation of FIG. 6. The database access unit 4 of the database unit 60 performs an operation similar to the operation of FIG. 7 so as to control the call waiting service.

Since the databases 3 are distributed over different prefectural areas, it is necessary to maintain the plurality of the databases 3 to have the same content. Mirroring is used to maintain the data in the databases 3 to have the identical content.

Figure 12:
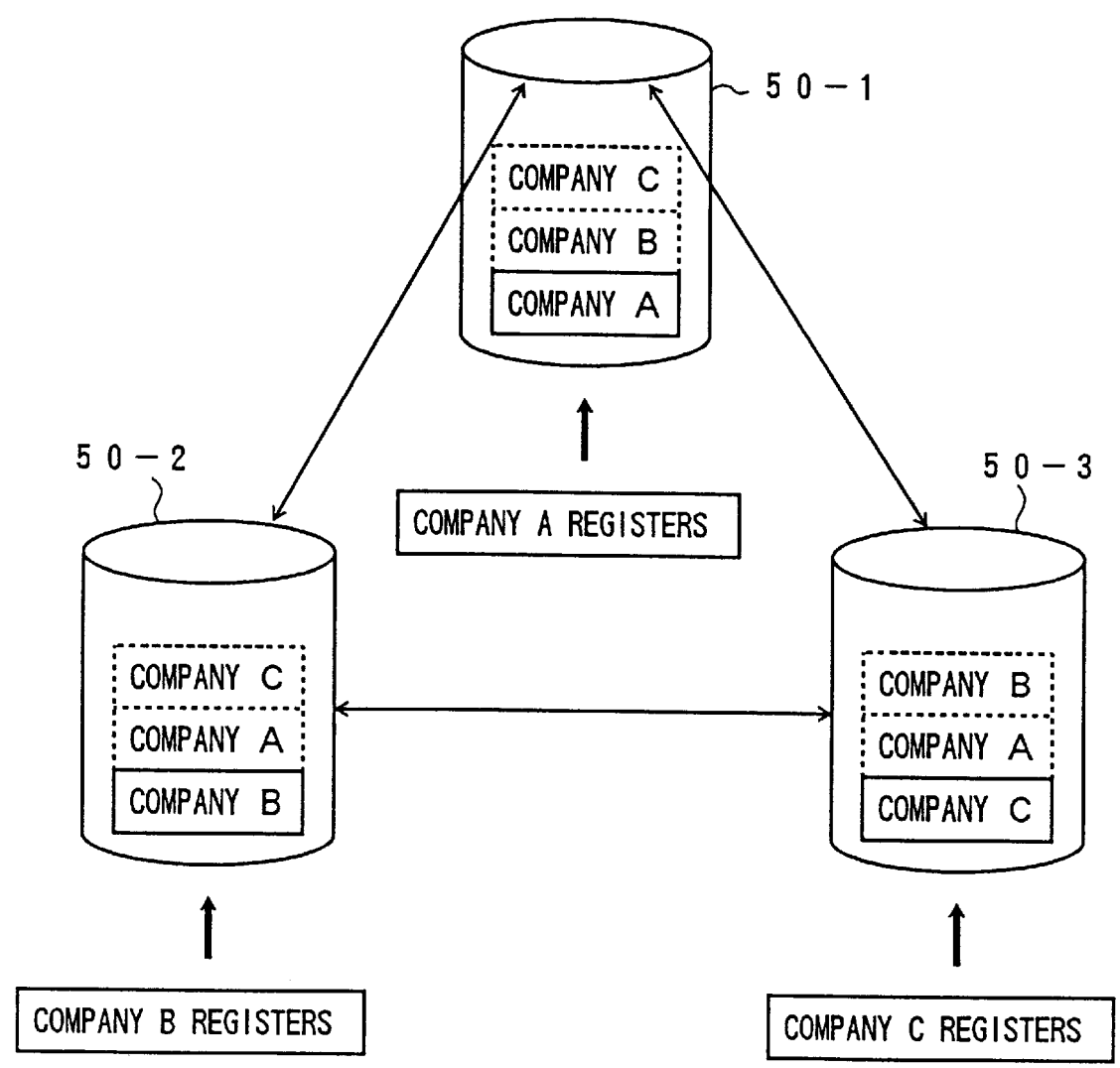
FIG. 12 shows how the databases are maintained to have the identical content.

FIG. 12 shows how the databases are maintained to have the identical content.

Referring to FIG. 12, it is assumed that Internet service provider A registers itself in a database unit 50-1 which is one of a plurality of databases distributed over a certain area, telecommunication service company B registers itself in a database unit 50-2, and Internet service provider C registers itself in a database unit 50-3.

For example, the database access unit 4 of each of the database units 50-1, 50-2 and 50-3 updates the content of the database 3 once in every 24 hours. Updating of the database 3 includes a process of comparing the contents of the databases 3 of the database units 50-1, 50-2 and 50-3 so as to register telephone numbers which have not been registered.

The updating operation is performed by the database access unit 4. Companies B and C which are registered in the database units 50-2 and 50-3, respectively, are registered in the database 3 of the database unit 50-1. Similarly, companies A and C which are registered in the database units 50-1 and 50-3, respectively, are registered in the database 3 of the database unit 50-2, and companies A and B which are registered in the database units 50-1 and 50-2, respectively, are registered in the database 3 of the database unit 50-3. Thus, the telephone numbers registered in the database 3 of the database units 50-1, 50-2 and 50-3 are maintained to be identical.

The present invention is not limited to the above-described embodiments, and variations and modifications may be made without departing from the scope of the present invention.

What is claimed is:

1. A telephone switching method using a telephone switched network and provided with a call waiting service for producing an interrupt responsive to a call incoming to a first subscriber when the first subscriber is communicating with a second subscriber, comprising the steps of:

identifying a destination number dialed by the first subscriber to originate a call;

verifying if the identified destination number is registered for data communication and determining whether the first subscriber is performing one of data communication and voice communication depending on the results of said verifying step; and suspending the call waiting service when it is determined that the first subscriber is performing data communication, and activating the call waiting service when it is determined that the first subscriber is performing voice communication.

2. The telephone switching method as claimed in claim 1, further comprising the step of determining, prior to the identifying and determining step, whether the first subscriber is a call waiting service subscriber and proceeding to the step of identifying and determining only when it is determined the first subscriber is a call waiting service subscriber.

3. A telephone switching apparatus provided with a call waiting service for producing an interrupt responsive to a call incoming to a first subscriber when the first subscriber is communicating with a second subscriber, comprising:

communication type identifying means identifying a destination number dialed by the first subscriber to originate a call and including verification means for verifying if the identified destination number is registered for data communication, said communication type identifying means determining whether the first subscriber is performing one of data communication and voice communication depending on the results obtained from said verification means; and interrupt service controlling means for suspending the call waiting service when it is determined that the first subscriber is performing data communication, and activating the call waiting service when it is determined that the first subscriber is performing voice communication.

4. The telephone switching apparatus as claimed in claim 3, further comprising:

service subscription determining means for determining whether the first subscriber subscribes to the call waiting service, and wherein said communication type identifying means identifies a type of communication for the first subscriber determined by said service subscription determining means to be a call waiting service subscriber.

5. A telephone switching apparatus provided with a call waiting service for producing an interrupt responsive to a call incoming to a first subscriber when the first subscriber is communicating with a second subscriber, comprising:

communication type identifying means for identifying a destination number dialed by the first subscriber to originate a call, and determining whether the first subscriber is performing one of data communication and voice communication depending on the destination number identified; and interrupt service controlling means for suspending the call waiting service when it is determined that the first subscriber is performing data communication, and activating the call waiting service when it is determined that the first subscriber is performing voice communication, wherein said communication type identifying means comprises:

a database for storing destination telephone numbers for access points of data communication; and database searching means for referring to said database so as to determine whether said destination telephone number dialed by the first subscriber is stored in said database, for determining that data communication is performed when it is determined that said database stores said destination telephone number, and for determining that speech communication is performed when it is determined that said database does not store said destination telephone number.

6. The telephone switching apparatus as claimed in claim 5, wherein said database and said database searching means are separate from said interrupt service controlling means and are connected to said interrupt service controlling means via a data communication line.

7. The telephone switching apparatus as claimed in claim 5, wherein a plurality of said databases are provided in a distributed manner, each of said plurality of databases comprising updating means for comparing data between said plurality of databases at predetermined intervals so as to maintain said data to be identical from database to database.

* * * * *